Fuller & Pierce.
Fly Trap.
No. 597. Reissued Sep. 7, 1858.
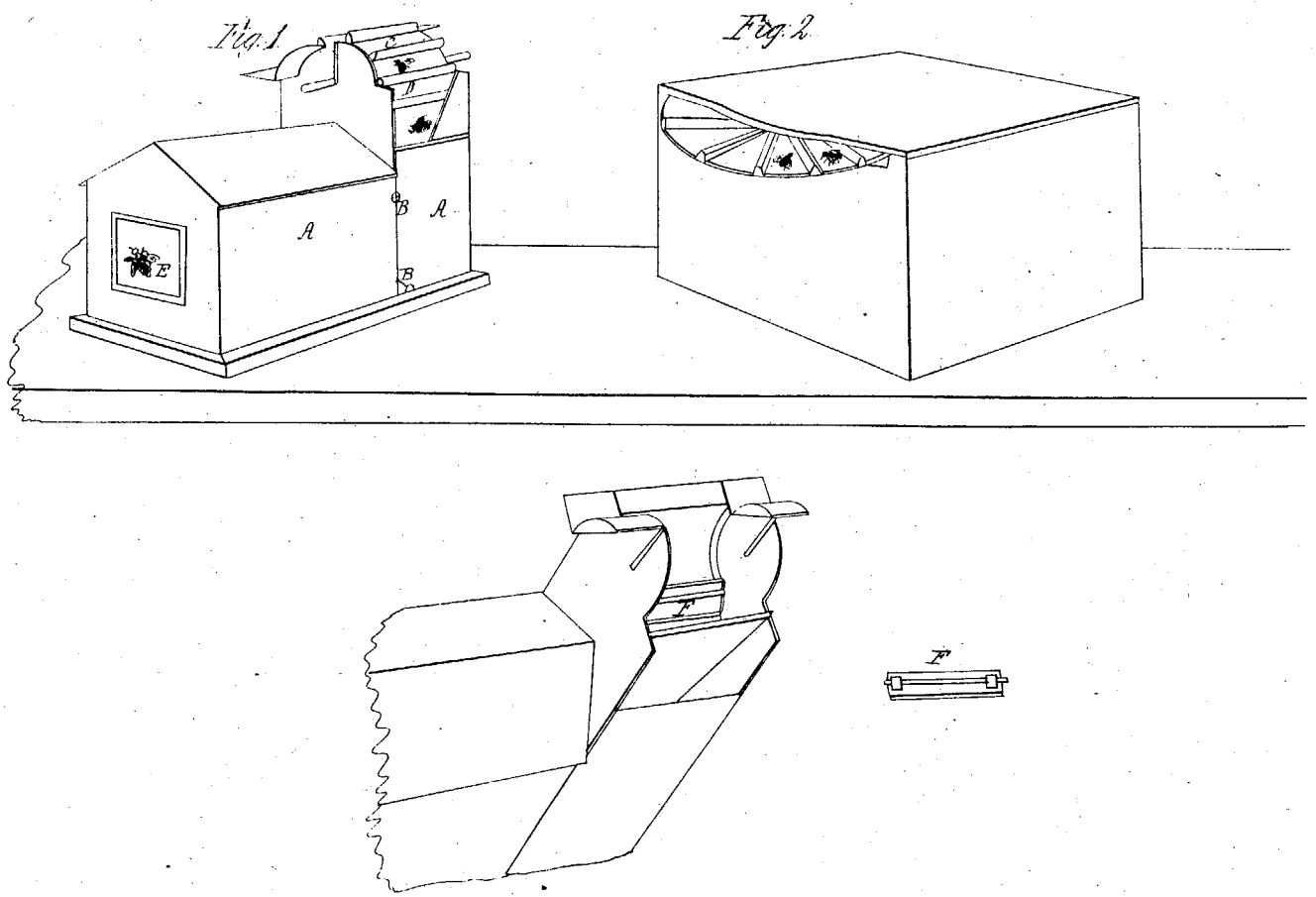

UNITED STATES PATENT OFFICE.

JOEL B. FULLER AND GEORGE W. PIERCE, OF WORCESTER, MASS.

TRAP FOR CATCHING FLIES.

Specification forming part of Letters Patent No. 7,288, dated April 16, 1850; Reissue No. 597, dated September 7, 1858.

*To all whom it may concern:*

Be it known that we, JOEL B. FULLER and GEORGE W. PIERCE, of the city of Worcester, county of Worcester, and State of Massachusetts, have invented a new and useful Machine for Catching Flies, called the "Self-Operating Fly-Catcher;" and we do hereby declare that the following is a full, clear, and correct description of the construction and operation of the same, reference being had to the annexed drawings, making a part of this specification, in which—

Figure 1 shows a perspective view of the machine and wheel. Fig. 2 shows a side view of the machine and part of the wheel.

A A represents the boxes into which the flies are conveyed.

B B represent the valves between the boxes, designed to admit the flies from one box to the other or confine them in either box.

C represents the wheel, with floats or projections on which the flies light, and the revolutions of the wheel conveys the flies into the boxes.

D represents a glass plate, placed in a perpendicular manner, designed to admit light for the flies when the wheel is in motion, thereby conveying the flies between any of the floats or projections into the box or boxes or vessel.

E represents a glass in box A, designed for a light to attract the flies.

F F represents a cleaner, which is to be placed in the inside of the box, under the wheel, as shown at F. The cleaner is balanced at each end, and one side or edge is made a little heavier than the other. The heaviest edge will of course hang down, and the upper or light edge comes nearly in contact with the cylinder or wheel, hits the flies, and starts them off between every two floats that come in contact with them. They are thus compelled to go into the box or vessel to find rest.

To enable others skilled in the art to make and use our invention, we will proceed to describe it.

We construct a box or boxes or vessel of any known form, and we apply a wheel, as shown at C, with floats or projections to the box, boxes, or vessel, in any position which will convey the flies into the box, boxes, or vessel, as shown at A, or bands passing round wheel or wheels, with floats or projections on the same, so as to convey the flies into the boxes or vessel. We construct on the inside of the box or vessel, under the wheel, a cleaner, as shown at F F, to prevent the escape of the flies from the boxes or vessel. We apply any known mechanical power in the movement of the wheel or bands, either by a circular or straight-forward motion. When the wheel is in operation, the bait, consisting of sugar, molasses, honey, or any attractive substance, being put on the wheel between the floats, the flies light thereon and are conveyed under the glass until they come in contact with the cleaner, as shown at letters F F, and when it becomes necessary to dispose of the flies they are shut in the box by a slide, and the box containing the flies is removed, the box emptied and replaced.

Now, what we claim as our invention, and wish to secure by Letters Patent, is—

The combination of the wheel or cylinder, having a rotatory motion with the box or case, for the purposes herein set forth.

JOEL B. FULLER.
GEORGE W. PIERCE.

Witnesses:
WM. G. STRONG,
JAS. G. ARNOLD.